United States Patent [19]

Demyon

[11] 4,103,641
[45] Aug. 1, 1978

[54] SIGHT GAUGE DEVICE FOR FLEXIBLE LIQUID CARRIERS

[76] Inventor: Thomas R. Demyon, 6201 Loch Raven Blvd., Baltimore, Md. 21212

[21] Appl. No.: 729,924

[22] Filed: Oct. 6, 1976

[51] Int. Cl.$^2$ ............................................. G01F 23/02
[52] U.S. Cl. ........................... 116/117 C; 116/118 R; 116/118 A; 73/334
[58] Field of Search ........... 116/118 R, 117 C, 117 R, 116/118 A; 73/334; 285/93, 252, 243, 253, 236, 238

[56] References Cited

U.S. PATENT DOCUMENTS

| | | | |
|---|---|---|---|
| 455,967 | 7/1891 | Lusk | 285/252 |
| 1,303,098 | 5/1919 | Merz | 285/252 |
| 1,578,193 | 3/1926 | Drake | 116/118 R |
| 2,681,034 | 6/1954 | Mannion | 73/334 |
| 3,248,946 | 5/1966 | Lichtenberg | 73/334 |
| 3,277,713 | 10/1966 | Demyon | 73/334 |
| 3,434,346 | 3/1969 | Demyon | 220/304 |

FOREIGN PATENT DOCUMENTS 138,547   1903   Fed. Rep. of Germany .......... 285/252

*Primary Examiner*—S. Clement Swisher
*Assistant Examiner*—Denis E. Corr
*Attorney, Agent, or Firm*—Walter G. Finch

[57] ABSTRACT

This invention relates to an indicating device that permits a sight reading of the level of liquid contained in or flowing through a flexible liquid carrier, such as a flexible hose. It particularly pertains to a hose used for the flexible connections in the cooling system of automobiles between the engine block and the radiator, but it is not limited to such use. It simplifies installation of a sight gauge for these and similar uses, and permits installation with simple basic tools.

1 Claim, 3 Drawing Figures

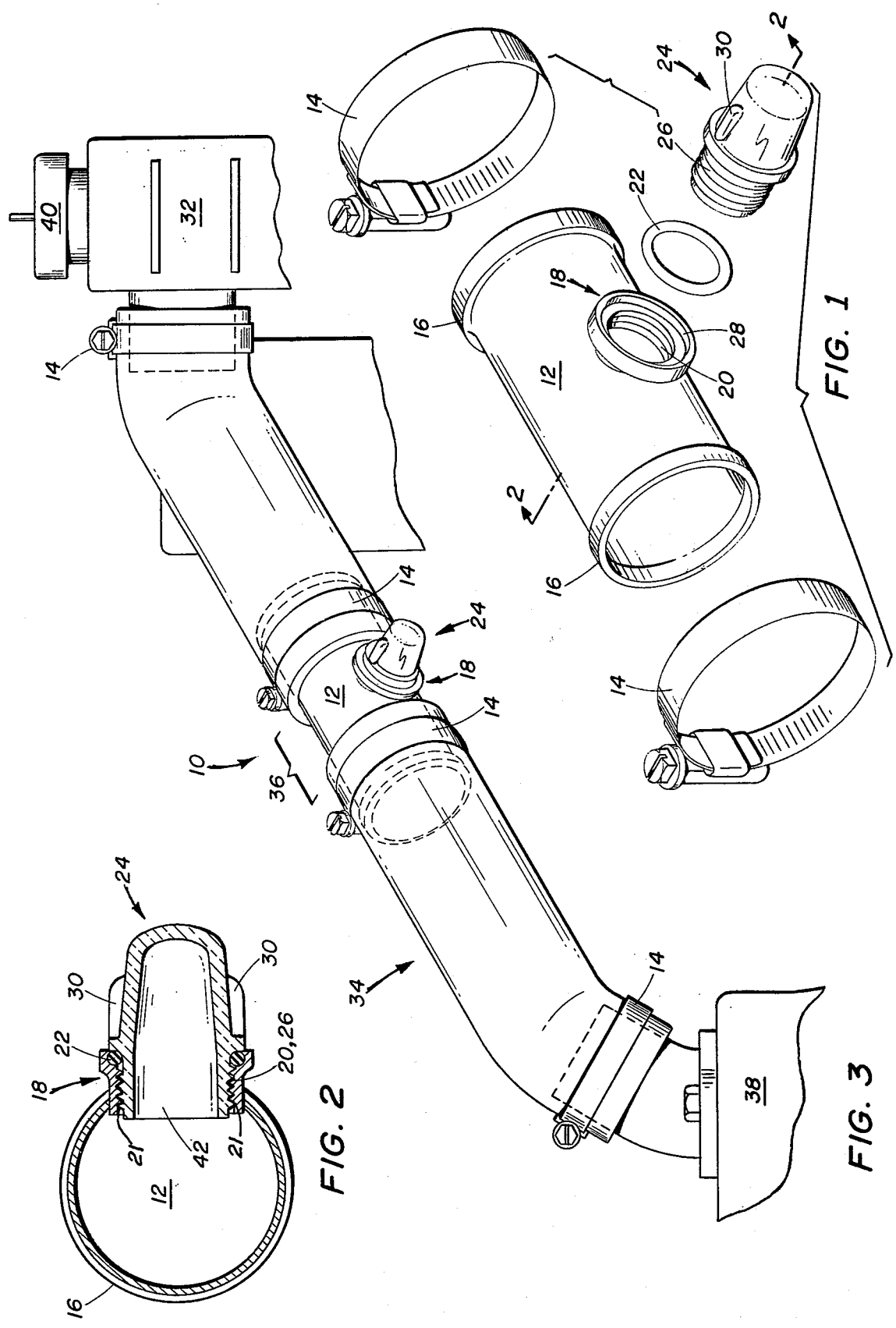

SIGHT GAUGE DEVICE FOR FLEXIBLE LIQUID CARRIERS

BACKGROUND AND SUMMARY OF THE INVENTION

While the device in this invention may be installed in numerous similar or related flexible liquid carriers, it is particularly suited for installation in the cooling system of automotive type equipment. Such an embodiment will be utilized herein to describe the invention.

The invention relates to an indicating device that permits a sight reading of the level of liquid contained in or flowing through a flexible liquid carrier, such as the flexible hose used in the aforementioned cooling system of automotive type equipment.

At present a motorist has difficulty ascertaining the amount of coolant (water or anti-freeze solutions) that is in the cooling system of a modern automotive vehicle. The usual method is to remove the fill cap of the radiator to check whether the level of the coolant is satisfactory by peering into the radiator.

This invention is an improvement over the sight gauge devices covered in U.S. Pat. Nos. 3,248,946 (in which the current inventor is a co-inventor), and 3,277,713 and 3,434,346 which are prior inventions of the current inventor.

With the present cooling systems in automobiles being pressurized to permit operation of the coolant at higher temperatures, there is some delay and danger involved when checking level of the coolant in the above mentioned manner. The delay being the time factor involved after loosening the cap to permit the pressure, steam, and possible boil-over to subside. The danger being the possibilities of escaping steam and boiling coolant scalding the person loosening or removing the fill cap. The alternative is to omit making a check and risk the possibility of overheating.

With the present invention, the need for loosening and then removing the fill cap for a sight reading of the level of the coolant liquid is eliminated. The sight gauge of the present invention, when installed in the flexible hose connection between the engine block and the radiator as hereinbefore described, permits an immediate sight reading of the level of the coolant liquid at that preselected point, an important point to prevent overheating and to keep those systems filled that have a recovery unit.

Another feature of the sight gauge device of the present invention is the ease with which it can be installed with simple tools (a do-it-yourself kit). The installation merely requires the severing of the existing flexible hose connection, or one being installed, into two pieces; then cutting a section off one of the two pieces to accommodate the length of the sight gauge device; inserting the ends of the device into the cut ends of the flexible hose; and installing standard hose clamps at each end of the device to clamp the hose to the device and seal it against leaks.

The present invention may be installed on existing systems as described hereinabove. It may also be installed in a similar simple manner by pre-fabrication on a production basis for new cars.

Existing sight gauge devices require drilling, and in some cases tapping, when installed in radiators. When installed in a flexible hose, the existing sight gauge devices require difficult threading of one portion of the device through a precise hole cut into the side of the hose. Both such installations of existing devices require specialized tools for the installation.

With the simple installation of the sight gauge of the present invention, the level of the coolant may be checked at anytime, particularly when any routine check is made under the hood of the car for crankcase oil level, battery water level, or similar such checks.

Accordingly, it is a primary object of this invention to provide a sight gauge device capable of being installed in a flexible liquid carrier for sight reading of the level of the liquid contained in or flowing through such flexible liquid carrier.

It is a further object of the invention to provide a device that may be installed with simple tools, and if desired on a do-it-yourself basis.

It is another object of the invention to provide a device that may be used in automotive cooling systems or in any other system, in which liquid at some point requires a check of the level of the liquid in the system.

It is yet another object of the invention to provide a simple and safe method of reading the liquid level in a system without the attendant dangers and delays of some existing systems.

Further objects and advantages of the invention will become more apparent in light of the following detailed description of the preferred embodiment of the invention.

BRIEF DESCRIPTION OF THE INVENTION

FIG. 1 is an idealized exploded view showing the complete unit;

FIG. 2 is a cross section view 2—2 of FIG. 1; and

FIG. 3 is a idealized pictorial view showing the unit installed.

DESCRIPTION OF THE PREFERRED EMBODIMENT

The embodiment shown in the drawings as the preferred embodiment is that utilized in the cooling system of an internal combustion engine. However, it is to be understood that the sight gauge device of this invention is intended for use in any flexible liquid carrier to permit a sight reading of the level of liquid contained in or flowing through such a flexible liquid carrier, and such other uses are within the intent and scope of the invention.

The embodiment of the invention shown in the drawings essentially operates according to the method of the invention, the parts of the device and the assembly of the device being merely illustrative since a variety of other devices by shape, material, configuration, or other design variation, could be used in the practice of the invention without departing from the scope of the invention.

As noted hereinabove, the invention contemplates the easy installation and the convenient sight reading of the level of liquid contained in or flowing through a flexible liquid carrier. One example of such an installation for convenient sight reading of the level of liquid contained in or flowing through a flexible liquid carrier, is the use in the flexible hose connection between the engine block of an automobile and the radiator of the automobile; this is illustrated in the drawings of this invention.

Referring now to the drawings the complete sight gauge device 10 shown in FIG. 3 assembled in the flexible liquid carrier 34, the flexible liquid carrier in this case being a flexible hose of an automotive engine connecting the engine block 38 to the radiator 32 for carrying the flow of the coolant used in the engine. As hereinbefore mentioned, the radiator cap 40 need not be removed to check the level of the liquid in the flexible liquid carrier 34 when the assembled sight gauge device is installed.

The assembled sight gauge device 10 consists of: the sight gauge device body 12, with flanged ends 16, and a side port 18; a transparent sight glass or sight bulb 24; and an "O" ring 22. These individual parts are further described hereinafter.

The side port 18 of the sight gauge device body 12 is provided with internal female threads 20 to accept the male threads 26 of the sight glass or sight bulb 24. The aforementioned side port 18 also is provided with an internal recess 28 for the aforementioned "O" ring 22. When the sight glass or sight bulb 24 is assembled to the side port 18 of the sight gauge device body 12 through the mating of the male threads 26 in the female threads 20, the "O" ring 22 is compressed in the internal recess 28 in the side port 18 and seals the assembled unit against leakage and loss of the liquid around the sight glass or sight bulb 24. The use of a liquid or semi-liquid sealant, that may or may not harden in place, instead of the "O" ring method for sealing the sight glass or sight bulb 24 connection to the side port 18 is within the intent and scope of this invention.

The sight glass or sight bulb 24 is provided with one or more ribs or bosses or protrusions 30 to facilitate gripping the sight glass or sight bulb 24 to turn it during the assembly process. It should be noted that the omission of ribs or protrusions 30 from the sight glass or sight bulb is within the intent and scope of this invention.

Observation of the level of the liquid in the system is made visually through the transparently clear sight glass or sight bulb 24. The liquid inside the system flows into the sight glass or sight bulb 24 through the open end 42 of the sight glass or sight bulb 24.

The assembly of the side port 18 in the sight gauge device body 12 is shown in FIG. 2 as being inserted. As shown it is soldered, welded, or brazed into position, depending upon the metals selected for the device parts. It should be understood that the insertion of the side port 18 as a separate part into the sight gauge device body 12 is one method. The forming of the side port 18 as an integral part of the sight gauge device body by molding, casting, or other method is within the intent and scope of this invention.

It should also be understood that the materials used for the sight gauge device body 12 and the side port 18, may be brass, aluminum, or other metals, or may be of various plastics materials of the polymer science, all of which are within the intent and scope of this invention. Likewise, the omission of threads from the side port 18 and the sight glass or sight bulb 24 and the use of an adhesive cement or glue to install the sight glass or sight bulb is also within the intent and scope of this invention.

The assembly of the sight gauge device 10 in the flexible liquid carrier, in the described embodiment of the invention, this being the aforementioned flexible hose 34, is accomplished as described below. A section 36 is cut from the aforementioned flexible hose 34. The assembled sight gauge device 10 is then inserted into the flexible hose 34 by slipping an end of the cut flexible hose 34 over each of the two end flanges 16 of the sight gauge device body 12. The assembled sight gauge device 10 is then turned inside the two ends of the flexible hose 34 until the sight glass or sight bulb is projecting from the side so that the liquid in the system will flow into open end 42 of the sight glass or sight bulb 24. Hose clamps 14, shown in FIG. 1, are then tightened around the flexible hose to clamp the flexible hose to the sight gauge device body on the inboard side of the flanges 16, to prevent leakage.

It is noted that the hose clamps 14 used to clamp the flexible hose 34 to the sight gauge device body 12 are the same as the hose clamps 14 used to clamp the flexible hose to engine block 38, and the radiator 32.

Depending on the type hose clamps used, they may be an open type which can be assembled after the sight gauge device 10 is inserted in the flexible hose 34 at the cut section 36, or they may be a closed type which must be loosened and placed on the cut ends of flexible hose 34 before the sight gauge device 10 is inserted. Whatever type is used, they do not detract from the intent or scope of the invention as they are standard units.

As should be apparent from the description provided of the embodiment of the invention, other sight gauge devices could be designed for the method of this invention, and it should be apparent from the method and description provided that other shapes, materials, sizes, or other such variations could be employed, without departing from the intent or scope of the invention as defined by the appended claims.

What is claimed is:

1. A sight gauge device for flexible liquid carriers comprising a cylindrical body means, a cylindrical port means in the side of said cylindrical body means, and a bulb-like observation means assembled to said cylindrical port means, said bulb-like observation means having at least one protrusion on the outside thereof to facilitate the assembly of said bulb-like observation means to said cylindrical port means, base clamp means, said cylindrical body means having flanged ends for insertion into and then for coupling to a flexible liquid carrier and secured thereto by said base clamp means around said flexible liquid carrier on the inboard side of each of said flanged ends of said cylindrical body means, the interior of said cylindrical body means communicates with the interior of said flexible liquid carrier into which each end of said cylindrical body means has been inserted with the interior of said cylindrical port means communicating with the interior of said cylindrical body means and also communicating with interior of said observation means assembled to said cylindrical port means, said observation means being hollow and formed of a transparently clear material wherein liquid level can be visually observed as the liquid flows by communication of and from said flexible liquid carrier into said cylindrical body means and then into said cylindrical port means and thence into said observation means, seal means, and said observation means being sealed by said seal means at the interface with said port means.

* * * * *